United States Patent [19]
Johnson

[11] 4,333,117
[45] Jun. 1, 1982

[54] DISC HEAD ARM POSITION CONTROLLER USING DIGITAL VELOCITY SENSING

[75] Inventor: Bruce E. Johnson, Minnetonka, Minn.

[73] Assignee: Magnetic Peripherals Inc., Minneapolis, Minn.

[21] Appl. No.: 164,435

[22] Filed: Jun. 30, 1980

[51] Int. Cl.³ .............................................. G11B 21/08
[52] U.S. Cl. .................................................... 360/78
[58] Field of Search ............... 360/78, 75, 77, 97–99, 360/135; 318/571, 561

[56] References Cited

U.S. PATENT DOCUMENTS

| | | | |
|---|---|---|---|
| 4,031,443 | 6/1977 | Droux | 360/78 |
| 4,068,267 | 1/1978 | Inouye | 360/75 |
| 4,068,269 | 1/1978 | Commander | 360/78 |
| 4,103,314 | 7/1978 | Case | 360/78 |
| 4,237,502 | 12/1980 | Erickson | 360/78 |
| 4,272,793 | 6/1981 | Van Landingham | 360/78 |

*Primary Examiner*—Robert M. Kilgore
*Attorney, Agent, or Firm*—Edward L. Schwarz; Joseph A. Genovese

[57] ABSTRACT

Electronic circuitry for improving the speed and accuracy of shifting the magnetic heads of a disk memory from one to another track cylinder. Head velocity is measured with great accuracy by measuring the servo head transit time between adjacent tracks of the servo disk. A microprocessor controller in conjunction with preferred velocity profile data stored in a read only memory provides a control signal to the linear motor control causing the head arm velocity to follow the preferred velocity profile with excellent precision.

10 Claims, 5 Drawing Figures

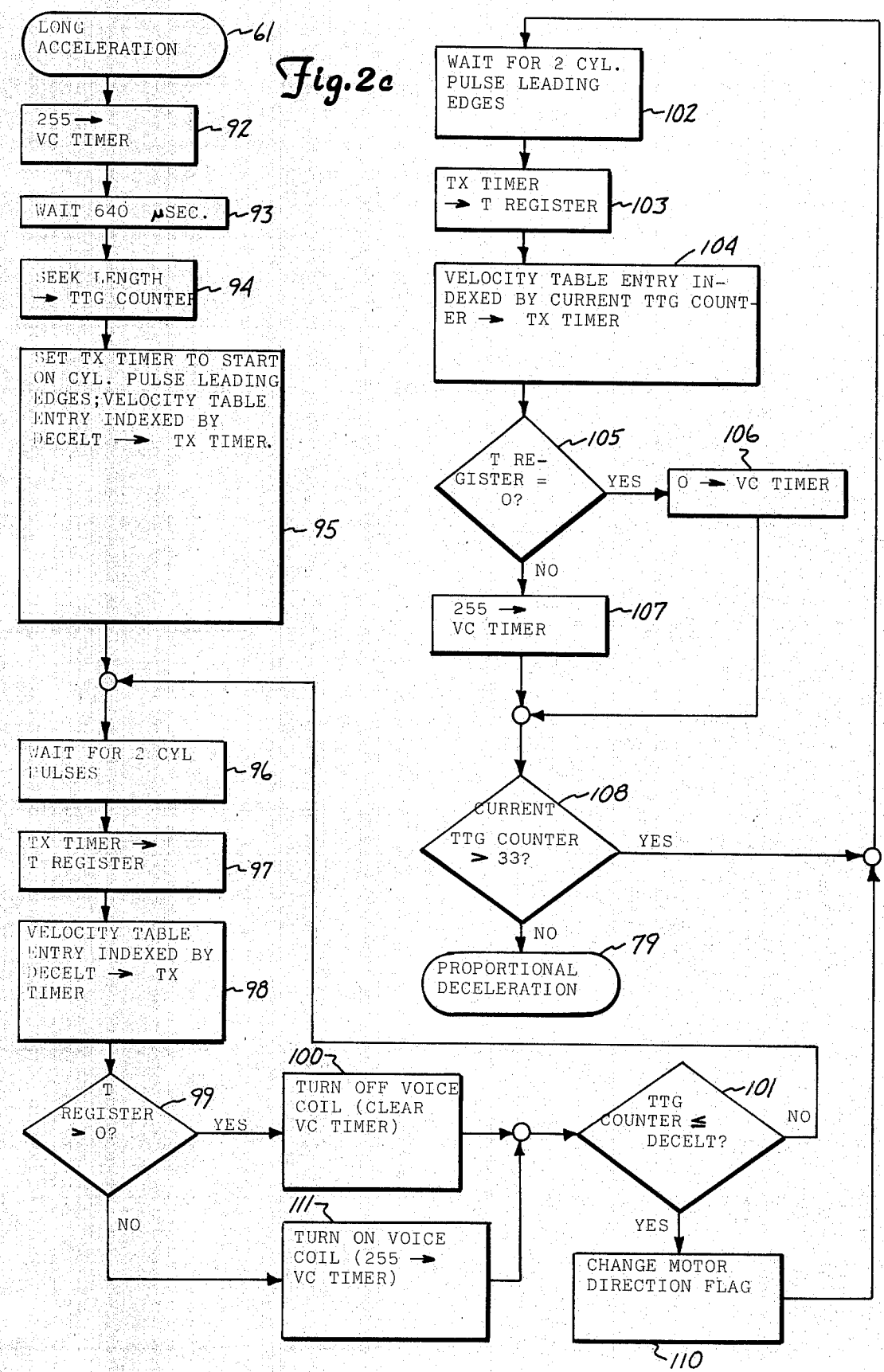

DISC HEAD ARM POSITION CONTROLLER USING DIGITAL VELOCITY SENSING

BACKGROUND OF THE INVENTION

The magnetic disk memory has become the dominant means of auxiliary storage of data in data processing systems. Although access times are still on the order of several milliseconds, once access is completed, data rates are quite high. Increased bit densities permit the storage of an astonishing amount of data in a relatively small volume.

In such devices a plurality of disks are usually mounted for rotation on a motor driven spindle. A carriage carries a plurality of arms, the free end of each carrying a transducing head placed in reading and writing proximity to a particular disk recording surface. The carriage is usually driven back and forth in a linear fashion by a linear motor or voice coil allowing the heads to scan radially across the disk surfaces to access the individual circular, concentric, sequentially numbered tracks. Recent important improvements in bit density and access time as a consequence of increased radial track density result from designating a surface of one disk, containing prewritten head positioning data, as a servo surface. A servo system controls the position of a servo head with respect to servo tracks on the servo surface thereby correctly positioning the carriage so as to allow the remaining heads to accurately address desired tracks on their respective recording surfaces. The servo tracks are also circular and concentric on the servo surface and are sequentially numbered. Each servo track along with its related data tracks form a group of tracks called a cylinder, each cylinder in essence defining a single carriage position. When it is desired to shift the heads from one cylinder to another in performing a so-called "seek" operation, the servo head is simply shifted to the corresponding destination track, allowing the selected data heads to reference the tracks in the desired cylinder. While the servo head is moving it generates a servo pulse as it crosses each servo track.

It is well-known that it is necessary to accurately control the velocity of the carriage during a move between track cylinders to assure rapid and accurate shifting between cylinders. This requires measuring instantaneous, or nearly instantaneous, velocity of the carriage. One common way to measure carriage velocity employs a magnetic speed transducer which is mounted within the linear motor and whose output signal is functionally related to the armature velocity. U.S. Pat. No. 4,031,443 (Droux, et al) discloses this type of mechanism. U.S. Pat. No. 4,068,267 (Inouye) employs the less conventional approach of differentiating the signals from the servo, in effect relying on the slope of the pulses which comprise the servo signal, to determine velocity. U.S. Pat. No. 4,068,269 (Commander, et al) describes apparatus which uses a similar approach to measure velocity.

BRIEF DESCRIPTION OF THE INVENTION

In this invention, carriage velocity during a seek is measured by measuring the time interval between successive servo signal pulse edges. An oscillator, whose cycle time is substantially smaller than the minimum time between successive servo pulses, provided pulses used to continuously decrement a counter referred to as the track crossing timer. Each servo pulse causes the contents of the timer to be stored for use by the carriage velocity servo control loop, and then to be set to a predetermined optimal count to permit measurement of the interval next following. As in conventional systems, the servo pulses are also used to decrement a servo pulse counter, which is set by the original move command to the number of tracks required by the move.

The value in the track crossing timer at each servo pulse, with the original and current servo pulse counter values, is used to control acceleration and deceleration of the carriage. In particular, when the servo head is decelerating and reaches 33 tracks from the desired track, the amount of deceleration to which the carriage is subjected in the succeeding inter-track intervals is proportioned to the velocity error. This permits the carriage to be smoothly and accurately decelerated to track following mode on the destination track without hunting or overshooting.

Accordingly, one purpose of this invention is to reduce the time required to move between tracks of a disk memory.

Another purpose is to reduce costs of the hardware which controls moving between tracks.

Still another purpose is to decelerate the carriage without producing hunting or overshoot at the end of the move.

BRIEF DESCRIPTION OF THE DRAWINGS

FIGS. 2a–2d contain the flowchart of the program executed by the microprocessor in FIG. 1 to perform the carriage shifting operation.

DESCRIPTION OF THE PREFERRED EMBODIMENT

Figure 1:
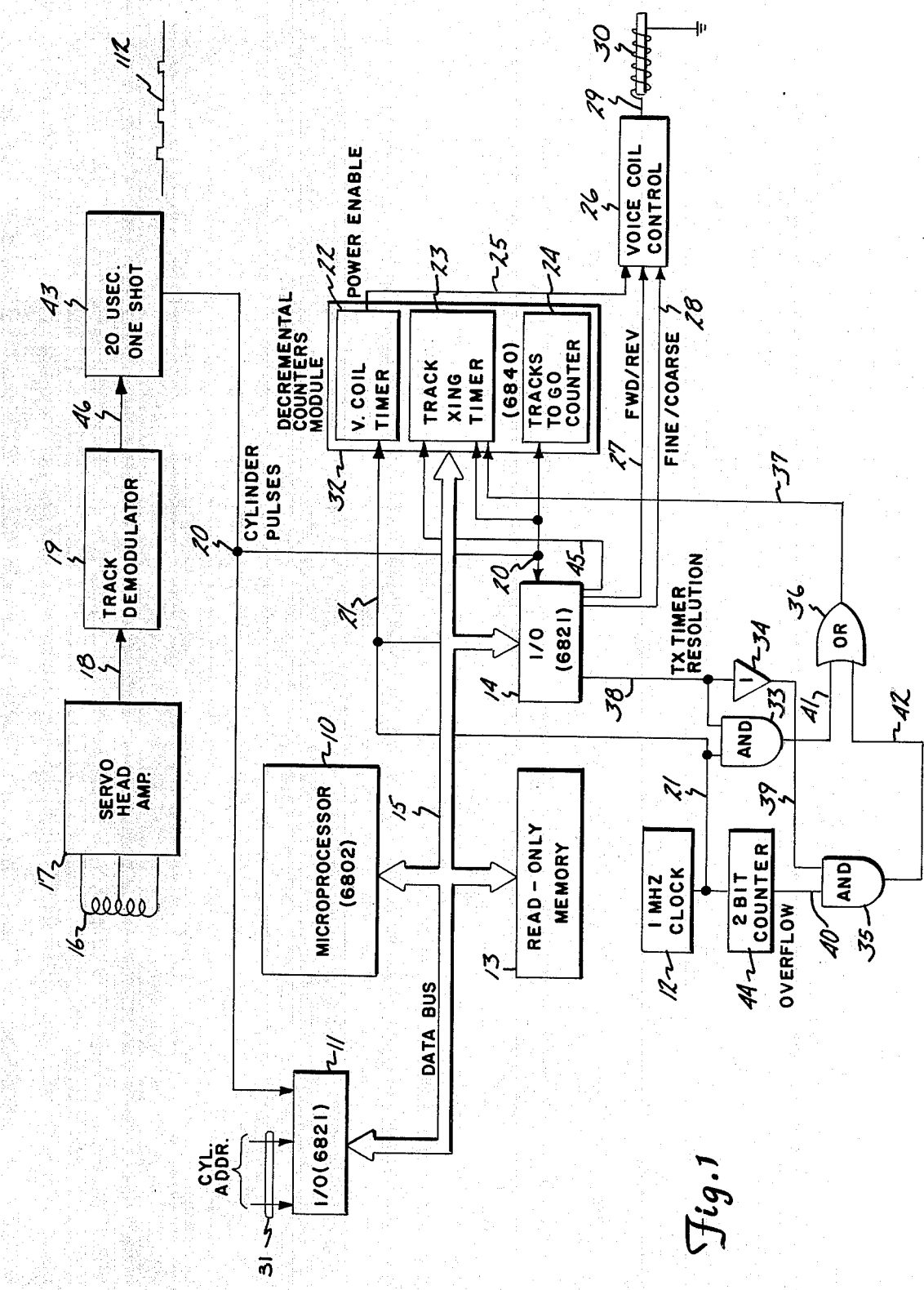
FIG. 1 is a block diagram of the hardware which performs the shifting from track to track.

FIG. 1 comprises essentially a small computer system with additional special purpose hardware to receive signals from servo head 16 and in response to them supply motor control signals to voice coil control 26. The servo head signals are generated by servo head 16, amplified by servo head amplifier 17, and transmitted on path 18 to track demodulator 19. Demodulator 19 changes its output signal on path 46 each time amplifier 17 output crosses a preselected level in a preselected direction. Each such change causes one shot 43 to produce a 20 usec. servo head or cylinder pulse on path 20. Thus, one shot 43 produces a train 112 of 20 usec. cylinder pulses, each pulse coinciding in exactly the same way timewise, with the servo track causing it, while the servo head moves across its disc in a radial direction. The repeatability and uniformity of the positional relationship of head 16 and a track versus the time when the associated cylinder pulse occurs is important, because the accuracy of this relationship determines the measured time between track crossings. As will be explained, this time is used as a measure of the velocity of servo head 16, and therefore the velocity of the carriage which transports servo head 16.

Microprocessor 10 is the heart of the head shifting apparatus, and executes instructions stored in read only memory (ROM) 13. Microprocessor 10 communicates with read only memory 13, as well I/O interfaces 11 and 14 and decremental counters module 32, on a data bus 15 permitting two-way communication between microprocessor 10 and these devices. These devices as well as microprocessor 10 are all off-the-shelf items available from Motorola, Inc., Schaumberg, Ill., whose model numbers appear in parenthesis on them in FIG. 1. Similar devices, well known to those skilled in the art, are available from other sources. By placing appropriate request signals on data bus 15, microprocessor 10 can cause the other elements attached to the bus to accept data from or transmit data to microprocessor 10. The program controlling the operation of microprocessor 10 is contained in ROM 13. ROM 13 with the proper program loaded in it can be considered simply another electronic element since it is unlikely to be changed until the controlled device itself is changed.

The new cylinder address is supplied to the computing system on data path 31. One commercial version of a disc memory employing this invention has a servo disc with 824 tracks, so 10 data lines are used to carry the cylinder address. Microprocessor 10 receives these cylinder addresses by sending appropriate control signals over data bus 15 to I/O interface 11, to whose input path 31 are attached. Cylinder pulses on data path 20 are also provided to microprocessor 10 via the I/O interface 14 and data bus 15.

The cylinder pulses on data path 20 are also direct inputs to track crossing (TX) timer 23 and "tracks-to-go" (TTG) counter 24. These timers and voice coil (VC) timer 22 together comprise decremental counters module 32. Each of these counters can be preprogrammed to decrement responsive to a preselected input signal format in any one of several ways. Their contents can also be read directly by data bus 15 at any time, and they have preprogrammable output capabilities as well. All can be preset to any desired value by microprocessor 10 via data bus 15. Specifically, voice coil timer 22 is programmed to decrement by 1 responsive to each pulse on path 21 and stop on 0. When VC timer 22 is 0, it produces a 1 on the power enable path 25, and 0 otherwise.

TX timer 23 is preprogrammed to have 2 different modes of operation either of which can be selected by executing the proper instruction in microprocessor 10 setting the flip-flop in I/O interface 14 which controls the signal on path 45. When this signal is 0, after microprocessor 10 sets TX timer 23 unequal to 0, TX timer 23 is enabled to begin decrementing by 1 for each pulse on path 37 responsive to the leading edge of the next cylinder pulse on path 20. When the signal on path 45 is set to 1, TX timer 23 is enabled to begin decrementing by 1 for each pulse on path 37 responsive to the next trailing edge of the cylinder pulse on path 20. In either case, TX timer 23 stops decrementing when a leading edge of a cylinder pulse on path 20 occurs or if TX timer 23 is decremented to 0. Accordingly TX timer 23 provides a means, when path 37 carries clock pulses and when the signal on path 45 is a 1, for timing between cylinder pulses. The 20 usec. cylinder pulse provides time for microprocessor 10 to store and to reload the contents of TX timer 23 after the leading edge which stops counter 23 and before a trailing edge which may start it again. When the carriage is moving very rapidly, microprocessor 10 does not have time to perform all its required functions in the time between the trailing edge of a cylinder pulse and the leading edge next following. For this situation, setting the signal on path 45 to 0 provides a means for timing every second interval between cylinder pulses. In this case, timer 23 is stopped by the leading edge of a cylinder pulse on path 20 and will not start until the next cylinder pulse leading edge occurs. This time has been determined to always be long enough to allow microprocessor 10 to complete its operations. At high speeds of the carriage, testing the speed every other track crossing has been determined to provide satisfactory speed control. Tracks-to-go (TTG) counter 24 decrements by 1 responsive to each cylinder pulse on path 20.

As is apparent from the term "timer" applied to TX timer 23 and VC timer 22, these counters have timed or clock inputs, which are presented on paths 37 and 21, respectively. A 1 mhz. clock or oscillator 12 provides on path 21 a pulse train, each of whose pulses' leading edge is 1 usec. from the leading edges of the 2 neighboring pulses. In addition, the logic network associated with AND gates 33 and 35 permits either 1 usec. or 4 usec. Pulses to be supplied on path 37 to TX timer 23. This allows the resolution of TX timer 23 to be either 1 or 4 usec. depending on whether the signal on path 38 is set to a 1 or a 0 by microprocessor 10 controlling the state of the appropriate flip-flop in I/O interface 14. Because of the wide range of velocities at which head 16 can be moved by voice coil 30, and the 8 bit size of TX timer 23, this is necessary to cover with sufficient resolution the time range between the very fastest and slowest head 16 velocity to be measured.

The resolution changing circuitry includes the 2 bit counter 44 which is driven by the clock pulse on path 21. Each fourth clock pulse causes an overflow from 2 bit counter 44 which produces a pulse on path 40. A 0 on path 38 is changed to a 1 on path 39 by inverter circuit 34 which enables one input of AND gate 35. Simultaneously, the 0 on path 38 disables a similar input of AND gate 33. The enabled input of AND gate 35 allows the 4 usec. pulses on path 40 to pass to path 42 and through OR gate 36 to path 37 and TX timer 23. When microprocessor 10 sets the bit in I/O interface 14 controlling path 38 to 0, then AND gate 33 is enabled and AND gate 35 is disabled. This allows the 1 usec. rate pulses from clock 12 on path 21 to pass through AND gate 33 to path 41, OR gate 36, and path 37 to TX timer 23. Simultaneously, the inverted signal on path 39, which is an 0, prevents the 4 usec. rate pulses from 2 bit counter 44 from reaching OR gate 36. In this manner, the spacing of pulses on path 37 applied to TX timer 23 can be set at either 1 or 4 usec. depending on whether the signal on path 38 is a 1 or a 0, respectively.

Voice coil or linear motor control 26 applies drive power to voice coil 30 on path 29 in response to the power enable signal on path 25 from VC timer 22. During operation, the direction of current flow through voice coil 30 (and direction for servo head 16 movement) is controlled by the signal on forward/reverse signal path 27. Fine/coarse signal path 28 selects the mode of control, viz. track following or track seeking. For the purposes of this invention, coarse control is secified throughout by the signal presented on path 28 except for the very beginning and end of each seek operation, where fine control is specified. Microprocessor 10 provides each signal directly through bus 15 and the flip-flop involved in I/O interface 14.

The hardware disclosed in FIG. 1 will not properly control the carriage speed and direction without presence of a proper program, or firmware, in read only memory (ROM) 13. In the preferred embodiment, this program becomes a fixed modification to ROM 13. Such memories are physically (electrically, usually) altered by entry of a program into them, and so are physically different from similar memories containing different data. This concept is important because invention lies in the steps of the program physically present in ROM 13.

Figure 2A:
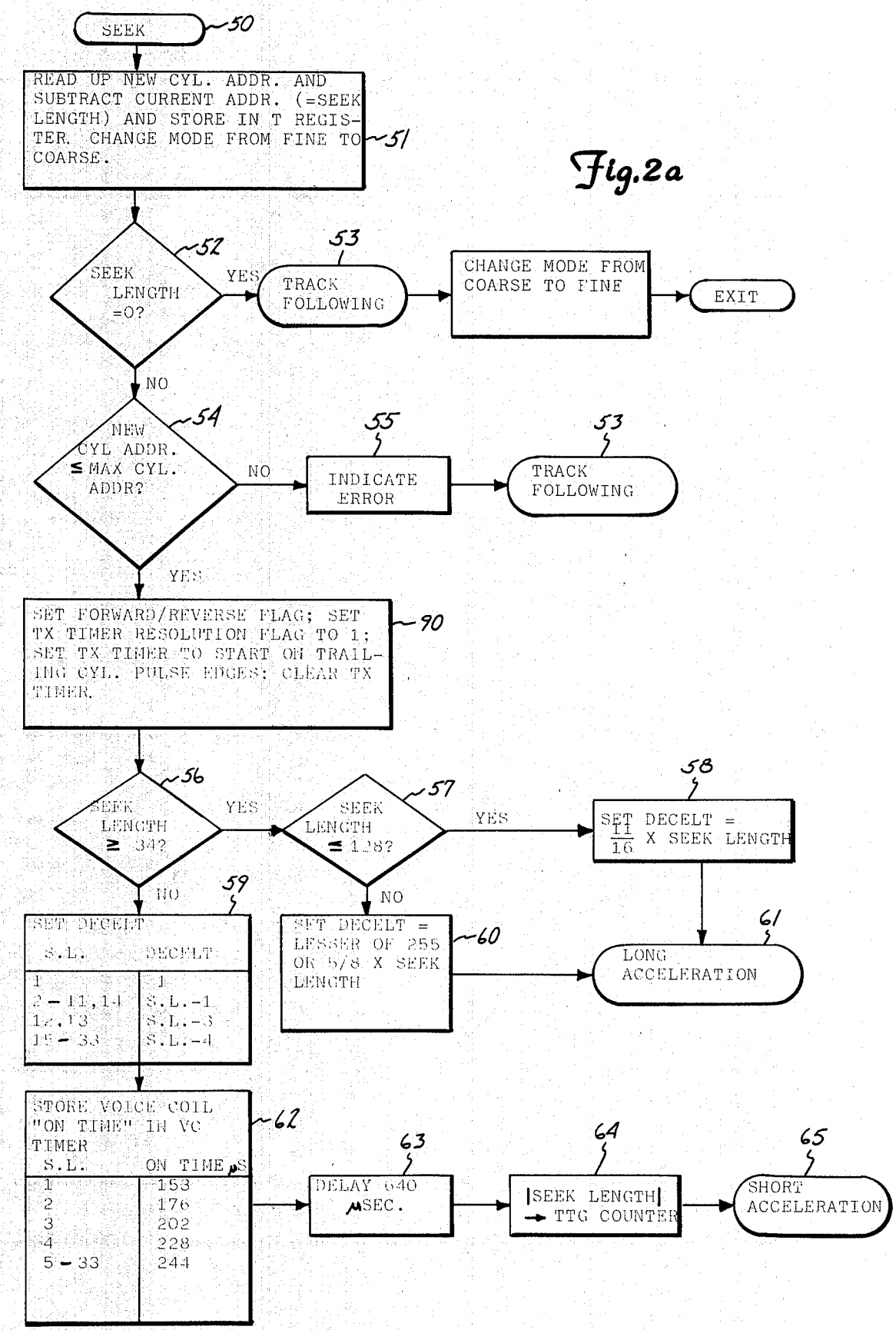
Figure 2B:
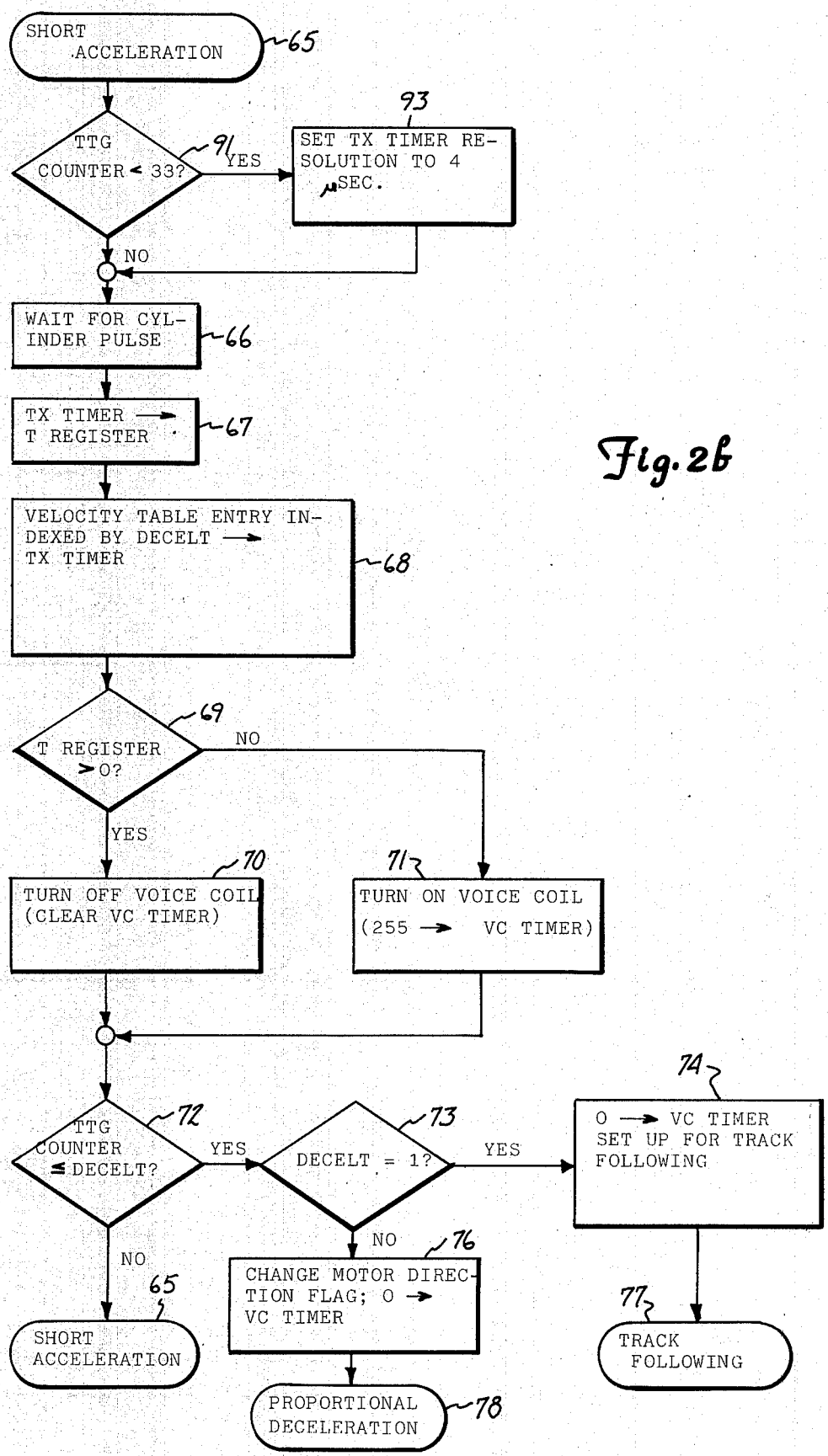
Figure 2D:
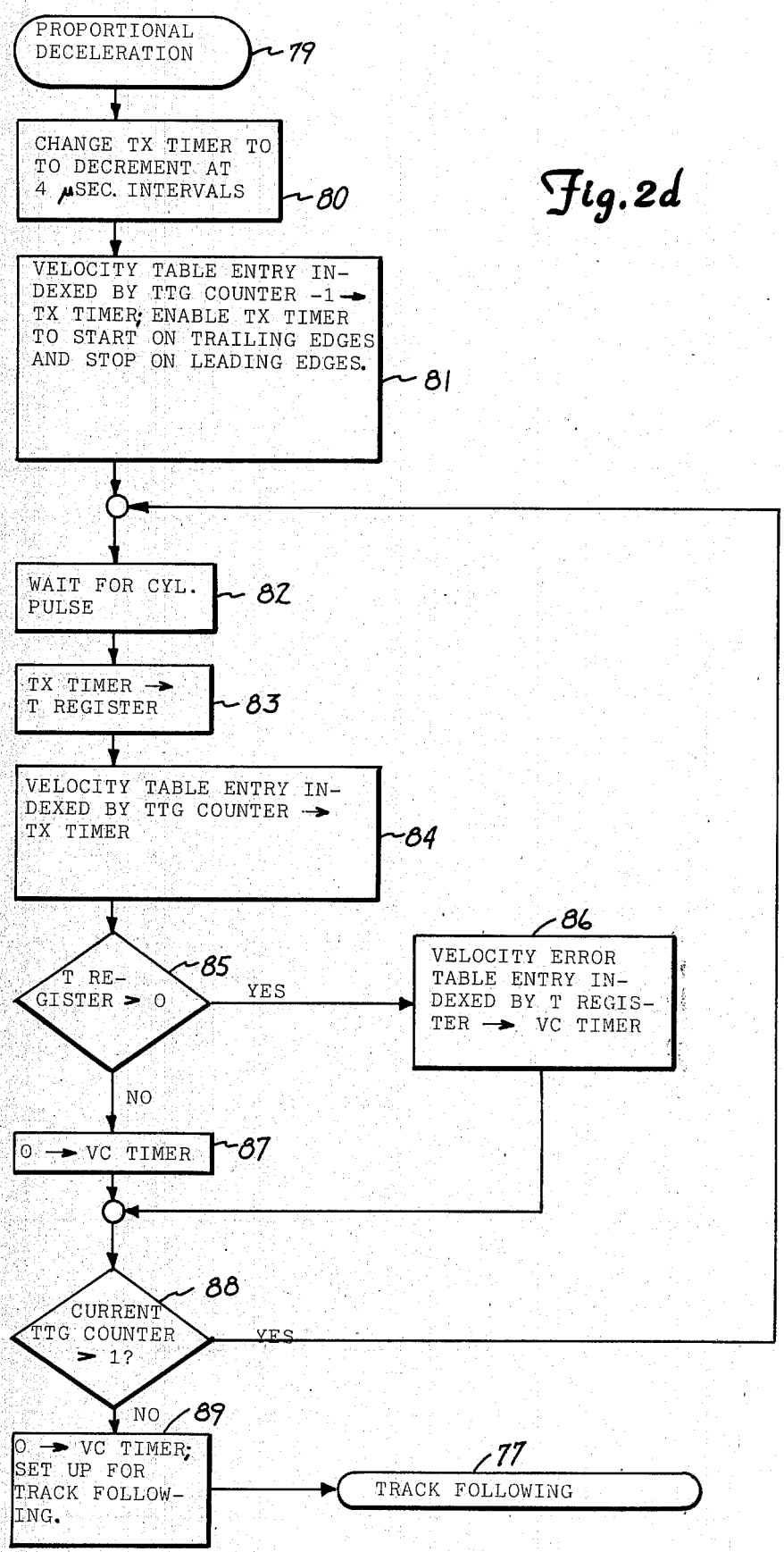

Turning next to FIG. 2a, it, along with FIGS. 2b–2d form a flowchart for the preferred firmware routine stored in ROM 13 and executed by microprocessor 10. In this flowchart, conventional symbology is followed, with ovals denoting continuity or initiation of instruction execution, diamonds denoting decision points, rectangular boxes denoting functional operations, and circles denoting internal entry points. Occasionally rectangular function boxes will implicitly include decision elements, but the functions performed therein are considered well-known in the computer arts. Those continuity ovals which are identical have the same reference numerals. Arrows in the pathways denote the sequence of events, pointing to later occurrences as between two elements of the chart.

The move operation starts with SEEK oval 50 in FIG. 2a. As FIGS. 2a–2d are discussed, certain functional capabilities of the apparatus of FIG. 1 will be explained in this context. Thus, a seek operation is entered at continuity oval 50 in response to an interrupt generated by the request for access to a new track, however generated. In response to the interrupt, microprocessor 10 begins execution of the seek operation which is the purpose of this invention, by executing the instructions represented by function box 51. These instructions cause the new cylinder address carried on path 31 to be read from I/O interface 11. The new cylinder address is stored in a convenient temporary (T) register within microprocessor 10, and the current address is subtracted from it, the absolute value of this difference being stored in another T register to be used later as the seek length. Microprocessor 10 then executes an instruction producing an input signal to I/O interface 14 which changes the fine/coarse mode bit on path 28 from fine mode to coarse mode. Enabling the coarse mode causes voice coil control 26 to disengage the track following control circuitry and to supply DC power to voice coil 29 in response to a power enable signal on path 25.

The instructions represented by decision diamond 52 test the difference between the current cylinder address and the new cylinder address, and if 0 return microprocessor 10 to execute its track following program segment as indicated by oval 53. This simply involves resetting the signal on path 28. If the difference between the new cylinder address and the current cylinder address is not 0 than the decision diamond 54 instructions test if the new cylinder address is greater than the maximum cylinder address. If this is true, then the seek request is illegal. This is indicated in some fashion by execution of instructions corresponding to function box 55, which take appropriate action to deal with the error and then return to the track following portion of the program to await further external response to the error. Assuming that the seek requested is legal and non-zero, microprocessor 10 then executes the instructions represented by function box 90, which transmits a signal to I/O interface 14 causing the forward/reverse flag on output path 27 to be set to prepare motor control 26 to accelerate the carriage and servo head 16 toward the destination track by further operations to be described shortly. TX timer 23 is set to decrement each microsecond by setting to 1 the flip-flop in I/O interface 14 controlling the signal on path 38. TX timer 23 is also set to begin decrementing, after each time it is loaded, by the next following cylinder pulse leading edge on path 20. This is accomplished by properly setting the flip-flop in I/O interface 14 which controls the signal on path 45. Finally, the contents of TX timer 23 are cleared.

A fundamental assumption for the acceleration and deceleration phases—viz. the remaining portion—of the program is that the kinematic characteristics of voice coil control 26, voice coil 30, and the carriage driven by it are independent of the cylinder address at any time. Thus, a 100 cylinder seek from cylinder 0 to cylinder 100 can be dealt with in the same fashion as a 100 cylinder seek from cylinder 700 to cylinder 600. The critical variables controlling carriage velocity are the length of the seek involved, that is, the value calculated in function block 51, and the tracks or cylinders to go. (The terms "cylinder" and "track" can in general by used interchangeably here. Strictly speaking, a cylinder comprises all the tracks of equal radius in a multisurface stack of recording discs. Thus each cylinder in one device employing this invention comprises a servo track and several data tracks. The term "tracks-to-go" in a seek operation refers to the servo tracks on the servo disc and is of course exactly the number of cylinders to be counted to reach the desired one.)

The preferred embodiment employs a velocity function which specifies a preferred servo head velocity during deceleration. This function is not continuous, but is instead defined in terms of track crossing time as a function of the current tracks-to-go value. Microprocessor 10 and ROM 13, functioning as an acceleration control means, generate an intermediate tracks-to-go value as a function of the initial tracks-to-go value and between it and 1. This intermediate value is used as the argument in computing the value of the velocity function which defines the maximum velocity in terms of minimum track crossing time during acceleration. This intermediate tracks-to-go value also defines the track at which active deceleration resulting from reversed force from linear motor or voice coil 30 starts. This intermediate tracks-to-go value will be referred to as DECELT (DECELeration Track) hereafter. The preferred algorithm by which DECELT is calculated is described in conjunction with operation block 56-61 of FIG. 2a.

During the acceleration phase, while microprocessor 10 functions as an acceleration control means, the track crossing time specified by the velocity function using DECELT as the argument, is compared every, or every other, inter-track interval with the actual track crossing time measured by TX timer 23. If the time measured by timer 23 is greater than that specified by the velocity function using DECELT as the argument, then microprocessor 10 causes more acceleration of servo head 16 toward the destination track to be applied by voice coil control 26 and voice coil 30 by setting VC timer 22 unequal to 0. If the track crossing time measured by TX timer 23 is less than that specified by the velocity function and DECELT, then acceleration of servo head 16 is halted by clearing VC timer 22.

When servo head 16 reaches the track corresponding to the DECELT value, the acceleration phase is completed. At the DECELT track microprocessor 10 and ROM 13 begins to function as a deceleration control means. If the seek is longer than 33 tracks, then deceleration occurs initially in the so-called bang-bang mode where deceleration power is applied to motor 30 continuously after a velocity comparison shows servo head 16 velocity exceeding that specified by the velocity function for the current tracks-to-go value. When a velocity test shows velocity to be less than that specified by the function, power is removed from motor 30 and head 16 coasts until a velocity measurement shows head 16 velocity exceeds that specified by the velocity function. It should again be mentioned that in the preferred embodiment actual velocities are not computed or tested. Only crossing times are tested, and the velocity function dependent variable is specified in crossing times rather than velocities.

When head 16 reaches a tracks-to-go value of 33, deceleration becomes proportional. That is, the length of time power is applied to voice coil 30 is dependent on the difference between the last measured velocity of servo head 16 and that specified for the corresponding tracks-to-go value from the velocity function. Since the measurements and comparisons actually are performed in times, each time difference is used as an independent variable in a proportional deceleration function to select one of a range of decelerating power "on" times for motor 30. These decelerating times generally increase over most of the interval of increasing differences between the track crossing times and the velocity function time corresonding thereto.

Although the velocity function and proportional deceleration function could be cast in terms of formulae computed by microprocessor 10, it is instead preferred to maintain these functional relationships in tabular form. Table I, Ideal Velocity Profile (see Appendix), is permanently stored in ROM 13 and provides preferred track crossing times during deceleration as entries in 1 or 4 usec. resolutions. Each tracks-to-go value between 1 and 255 is a direct index to Table I for its associated preferred track crossing time. The addressing algorithm then simply requires the tracks-to-go value to be added to the base address in ROM 13 of Table I to provide the address of the preferred crossing time for any tracks-to-go value.

Table II incorporates the proportional deceleration function where the error in microseconds is the index specifying the entry containing the proper duration of decelerating power to voice coil 30. The error is the time which the track crossing time from Table I exceeds the measured track crossing time; i.e., deviates from the preferred track crossing time on the side of excessive velocity. Table II is also stored in ROM 13, and adding its base address to the error specifies the address of the appropriate decelerating power duration. Note that head 16 coasts during the next period whenever TX counter 23 has counted down to 0, i.e., the velocity error is 0 or negative. Note also that the deceleration power is not related to the current tracks-to-go value, even though less power is theoretically required to correct for a given track crossing time error at a smaller current tracks-to-go value and lower velocity than at a larger tracks-to-go value.

Flowchart blocks numbered from 56 to 61 represent the machine instructions which cause microprocessor 10 to compute the DECELT algorithm. In decision diamond 56, seek length is tested to be equal to or greater than 34. If less than 34, the table in operation box 59 is used to set DECELT. For a 1 track seek length, DECELT is set to 1. No attempt is made later in the operation to decelerate the carriage since the track following system can most reliably lock onto the carriage and control its position when the carriage approaches the desired cylinder at a preselected velocity, two inches per second in the commercial version for which this control system is designed. This velocity is achieved, as will be explained later, by the operations in function box 62. For the remaining seek lengths from 2 to 33, DECELT is specified in the table of function box 59, as being either 1, 3 or 4 less than the original seek length. The choice of these values in a given system depends on the kinematic characteristics of the carriage driven by voice coil 30, and voice coil 30 itself.

Decision diamond 57 branches to either function box 60 or function box 58. For seek lengths greater than 33 and less than or equal to 128, DECELT is set to the integral value of 11/16 multiplied by the seek length by function box 58's instructions. When the seek length exceeds 128, DECELT is set to the lesser of the integral value of ⅝ times the seek length, or 255, by function box 60's instructions. After DECELT has been set for a seek length in excess of 33, the hardware executes the instructions which begin with long acceleration oval 61 in FIG. 2c.

If seek length was originally less than 34, than after DECELT has been set, the initial voice coil on-time is set as a function of the seek length by the execution of instructions corresponding to operation box 62. As explained earlier, when voice coil timer 22 is unequal to 0 a power enable signal is produced on path 25 which causes motor control 26 to apply current to voice coil 30. The direction is controlled by the previously set forward/reverse signal on path 27. Voice coil timer 22 is decremented by 1 each 1 usec. clock pulse. Hence storing the on-time entry in the table of operation box 62 in VC timer 22 causes the motor control to supply power for that specified amount of time.

When the carriage is first accelerated to move off its track, servo head 16 may generate a false cylinder pulse. For the commercial embodiment here involved, a delay of 640 usec. as provided by function box 63 will assure that no false cylinder pulses will be generated and that crossing of the first track will be properly sensed. After the 640 usec. period has elapsed, the instructions corresponding to operation box 64 cause the seek length absolute value, previously stored in a T register, to be transmitted to tracks-to-go (TTG) counter 24. As explained earlier, each cylinder pulse on path 20 causes the contents of TTG counter 24 to be decremented by 1. The delay of function box 63 assures that the seek length is not placed in counter 24 until no possibility of a false track crossing pulse exists.

FIG. 2b describes the operations for completing the acceleration phase of a short seek; i.e., one for a seek length of 33 tracks or less. Short acceleration connector oval 65 shown in FIGS. 2a and 2b denotes an uninterrupted sequence of instructions from those performing the functions of box 64 to those of decision diamond 91. Executing the instructions corresponding to decision diamond 91 causes microprocessor 10 to read the contents of TTG counter 24 and test whether it is less than 33 or not. If it is, then microprocessor 10 executes instructions corresponding to function box 93 which changes the resolution of TX timer 23 from the 1 usec. previously selected for it, to 4 usec., by changing the flip-flop in I/O interface 14 to produce a 0 on path 38.

Operation of the system continues with execution of the instructions represented by function box 66 which cause microprocessor 10 to continuously read the input of I/O interface 11 which receives the output of 20 usec. one shot 43. Setting of one shot 43 sets its bit in I/O interface 11, and means that a cylinder pulse has been detected by servo head 16. When the appropriate bit is set in I/O interface 11, the instructions in microprocessor 10 read it, thereby clearing it, and cause the instructions represented by function box 67 to be executed. These instructions cause the contents of TX timer 23 to be loaded into a temporary (T) register internal to microprocessor 10. The instructions performing the operations of block 68 then cause microprocessor 10 to enter the ideal velocity profile table with the DECELT tracks-to-go value as the index and load this value into TX timer 23, thereby preparing it to be enabled by the next cylinder pulse trailing edge. Note that the time for servo head 16 to traverse the first inter-track space isn't measured.

The value just read from TX timer 23 into the T register is then tested by the instructions of decision diamond 69. If the residue of TX timer 23 just stored in the T register is greater than 0, this means that the carriage is traveling faster than desired, because fewer than Table I's ideal number of microseconds has been decremented from TX timer 23. (During the first execution of these instructions during each seek operation the TX timer 23 residue will always be 0 because the instructions represented by function box 51 set it to 0, and it has not been altered since.) If the T register is not 0, microprocessor 10 begins executing the sequence of instructions represented by function box 70, which simply effects the transmitting of a 0 to VC timer 22, turning off voice coil 30. If TX timer 23 had been counted down to zero prior to the last cylinder pulse (or this is the first pass), then microprocessor 10 instead executes the instructions represented by function box 71. These instructions turn on voice coil 29 by transmitting 255 to voice coil timer 22.

The foregoing operations for controlling power to voice coil 30 have the effect of limiting the radial velocity of servo head 16 (and the carriage supporting and moving it) so when the contents of TTG counter 24 becomes equal to the DECELT value, the velocity will be very close to that ideal velocity listed in Table I for the DECELT value. No great harm occurs if the velocity is less than this value, since the only effect is that the seek occurs slightly more slowly than is possible. However, if the velocity of servo head 16 is too great (i.e., the number of times TX timer 23 is decremented in a given interval is too small), it is possible that servo head 16 may overshoot the desired track requiring another seek or perhaps even causing data in the wrong track to be read.

The instructions next executed are represented by decision diamond 72, and determine whether or not the acceleration phase of a seek has concluded. The contents of TTG counter 24 is read up and stored in a T register in microprocessor 10 and compared to the DECELT value. If the TTG counter 24 contents are equal to or less than the DECELT value, then microprocessor 10 causes execution of the instruction sequence corresponding to decision diamond 73. For a seek of 2, the instructions corresponding to function box 59 caused microprocessor 10 to set DECELT to 1. If the instructions for decison diamond 73 detect the DECELT value to be 1, then the instructions for function box 74 are executed. These cause voice coil timer 22 to be cleared, shutting off voice coil 30, and then a standardized sequence for setting up the track following function occurs. This include setting the fine/coarse signal on path 28 to indicate fine control to voice coil control 26 and setting the internal microprocessor register storing the current address between seeks to the seek address. If the instructions corresponding to decision diamond 73 cause microprocessor 10 to determine that DECELT is not 1, then the instructions corresponding to function box 76 are executed. Microprocessor 10 is caused to toggle the flip-flop controlling the signal on forward/reverse path 27 to change the direction of current flow through voice coil 30. The power to voice coil 30 is turned off, and microprocessor 10 is caused to execute a sequence of instructions which will proportionately (to the current speed) decelerate the carriage and servo head 16 to the appropriate speed for entering fine control, as indicated by proportional deceleration connector oval 78. Lastly, if TTG counter 24 contents are greater than the DECELT value, then the instructions corresponding to decison diamond 72 cause the sequence of instructions coresponding to function box 91 to be re-executed, as indicated by short acceleration connector oval 65.

Recall that in FIG. 2a microprocessor 10 differentiated between a short seek of 33 tracks or less, and a long seek where the length is at least 34, by the instruction sequence represented by decision diamond 56. When seek length is at least 34, an eventual exit from that sequence of instructions is represented by the long acceleration connector oval 61. Connector oval 61 in FIGS. 2a and 2c represent the start of executing instructions corresponding to function box 92, which cause 255 to be transmitted to voice coil timer 23. This causes voice coil 30 to begin accelerating servo head 16 toward the desired track. After this acceleration has commenced, microprocessor 10 is caused to wait 640 usec., as represented by function box 93, to permit any spurious cylinder pulse to be ignored. After this interval, microprocessor 10 executes the instructions corresponding to function box 94 which cause the seek length to be transmitted to TTG counter 24. The instructions corresponding to function box 95, executed next, cause microprocessor 10 to change the flip-flop in I/O interface 14 to set the signal on path 45 to start decrementing on cylinder pulse leading edges and stop decrementing on each cylinder pulse leading edge next following. Then, as with the instructions corresponding to function box 68 on FIG. 2b, the remaining instructions represented by function box 95 cause microprocessor 10 to enter the ideal velocity profile table stored in read only memory 13 and use DECELT as an index to extract the terminal velocity of the carriage in usec. per inter-track interval and store this value in TX timer 23.

Recalling the description of TX timer 23's operation, TX timer 23 will begin decrementing when the first cylinder pulse occurs after TX timer 23 is loaded. Because of the way TX timer 23 is programmed, the second cylinder pulse stops decrementing of TX timer 23. Microprocessor 10 then executes instructions substantially identical to function box 67 in performing the instructions of function box 97 in storing the TX timer 23 residue. Similarly, instructions for function box 98 ae essentially identical to those for function box 68 in reloading TX timer 23 with the nominal minimum track crossing time for the seek. The instructions represented by decision diamond 99 perform the same test on the latest residue of TX timer 23 that the instructions representing decision diamond 69 do. Thus, accordingly as the latest residue of TX timer 23 is greater than 0 or not, voice coil 30 is turned off or turned on as shown in function boxes 100 and 111, in a fashion identical to the instructions represented by function boxes 70 and 71. The instructions represented by decision diamond 101 are essentially identical to those represented by decision diamond 72. Until the contents of TTG counter 23 equals the DECELT value, the instruction sequence starting with the instructions corresponding to function box 96 is continuously executed and voice coil 30 powered so as to apply acceleration to servo head 16 whenever its speed falls below that contained in the ideal velocity profile table (Table I) for the specified value of DECELT.

As explained in conjunction with FIG. 1, because these longer seeks involve very high terminal speeds for head 16, microprocessor 10 will not be able to complete the processing required within the time between two adjacent cylinder pulses. Therefore, 2 inter-track intervals are used to complete the execution of instructions forming the loop starting with function box 96 and ending with decision diamond 101. During the first, TX timer 23 is running; during the second TX timer 23 is halted. During this phase, measuring velocity every other interval between cylinder pulses is accurate enough to provide the needed velocity control without sacrificing either the ability to decelerate the carriage in time to prevent overshoot or to follow the ideal velocity profile to achieve near minimum seek times. Because of this situation the instructions represented by decision diamond 101 must test the contents of TTG counter 24 to be equal to or less than the DECELT value.

When TTG counter 24 contents become less than or equal to the DECELT value, microprocessor 10 is caused to exit the acceleration loop involving symbols 96–101 and 111, and starts executing the series of instructions which serve as a deceleration control means, the first of which is represented by function box 110. The function box 110 instructions toggle the signal on forward/reverse signal path 27, so that if for example voice coil 30 had been accelerating head 16 towards the center of the disk, the current is now reversed to decelerate head 16 in that direction. After executing these instructions, microprocessor 10 continues to execute the sequence of instructions starting with those represented by function box 102, which comprises another wait for 2 cylinder pulses. When both have occurred, the instructions of function box 103 again places the contents of timer 23 in a T register. The instructions next executed, represented by function box 104, cause the current TTG counter value to be read up and used as an index to the ideal velocity profile table (Table I) to extract the velocity from it in terms of time between successive cylinder pulses. This value is stored in TX timer 23 preparatory to another countdown sequence during the next interval between cylinder pulses by the instructions represented by function box 104.

During this first deceleration phase, head 16 velocity is controlled in a bang-bang mode. Accordingly, the velocity of servo head 16 is adjusted by applying the decelerating current to voice coil 30 for 2 entire intertrack intervals. If the previously read residue in TX timer 23 was 0, then the instructions for decision diamond 105 detect the contents of the T register equal to 0 and stop decelerating current flow in voice coil 30 by executing the instructions for function box 107, which cause voice coil timer 22 to be set to 0. If TX timer 23 residue at the time the previous cylinder pulse occurred is greater than 0, then voice coil timer 22 is set to 255 by the instructions corresponding to function box 106. After voice coil timer 22 has been properly set, the instructions of decision diamond 108 test the current contents of TTG counter 24 to see whether it is greater than 33 or not. If it is greater than 33, then the deceleration control by microprocessor 10 continues to operate in the bang-bang mode and the sequence of instructions starting with those corresponding to box 102 are re-executed. If the current contents of TTG counter 24 are equal to or less than 33, then the instructions corresponding to function box 80 (FIG. 2d) are next executed, as implied by the proportional deceleration connector oval 79.

The instructions represented by the flow chart symbols of FIG. 2d provide proportional deceleration of servo head 16. That is, the amount of time which decelerating current is applied to voice coil 30 is approximately proportional to the number of microseconds too quickly which head 16 completed the traverse between the previously crossed inter-track interval. Although amperage in voice coil 30 could be modulated, the modulation I prefer is in the width of the deceleration pulses.

The first activity microprocessor 10 has in the proportional deceleration phase is to change TX timer 23 to decrement at 4 usec. intervals as shown in function box 80, by changing the signal on path 38 from a 1 to a 0. Next, function box 80 shows the entry in the ideal velocity profile table indexed by the contents of TTG counter 24 minus 1 transmitted to TX counter 23 and I/O interface reset to cause TX timer 23 to start decrementing on cylinder pulse trailing edges. The correct value must be used in timing the interval between successive cylinder pulses, because proportional control of the deceleration requires an accurate measure of the deviation from the ideal profile for each interval. Thus, the velocity error table (TABLE II) takes into account the 20 usec. duration of each cylinder pulse.

Microprocessor 10 is caused to wait for a cylinder pulse leading edge (function box 82) to stop TX timer 23 decrementing and then effects transmission of the contents of TX timer 23 (function box 83) to an internal T register. An ideal velocity profile table entry indexed by the contents of TTG counter 24 is transmitted to TX timer 23 (function box 84). While this occurs, TX timer 23 is started decrementing by the trailing edge of the just-sensed cylinder pulse. Next the instructions corresponding to decision diamond 85 are executed. If the register which contains the previous value of TX timer 23 is equal to 0, the instructions corresponding to function box 87 are executed, causing voice coil timer 22 to be cleared and no deceleration to occur. If the previously stored contents of TX timer 23 are greater than 0, this implies that the carriage is moving more rapidly than is ideal for the given TTG value.

As explained earlier, errors during this portion of deceleration are corrected in a proportional mode rather than in bang-bang mode. Table II of the Appendix, Velocity Error versus Voice Coil Power Pulse Durations, provides the appropriate voice coil pulse width or on time for each residue value in TX timer 23. For example, in Table II, if the residue in the T register stored by the instruction represented by function block 83 was equal to 15, the voice coil on time specified by Table II would be 28. Similarly, if TX timer 23 residue is greater than or equal to 139 (556 usec.) the on time would be 255 usec. The instructions represented by function box 86 simply use the contents of the T register which contains the residue from the last countdown of the TX timer as an index to Table II, and insert the value so identified it in VC timer 22. The entries of Table II are chosen to provide enough power to voice coil 30 to decelerate servo head 16 in an amount sufficient to keep the velocity very close to the theoretically ideal velocity. The more rapidly than ideal head 16 is moving, the greater will be residue in TX timer 23. Inspection of Table II shows that the entries in it for increasing TX timer 22 residues generally increase proportionately. There are several points of discontinuity, however, in Table II. These are peculiar to the characteristics of the particular system involved. Different values will be necessary for another system. Although theoretical calculation of these values is possible, in actual practice the theoretical values must be changed substantially through experimentation to find values that will cause the system to perform properly with unavoidable tolerances in voice coil control 26, voice coil 30, and the mass and friction in the carriage. Note also that a TX timer 23 residue of a certain value represents a much lower velocity error when servo head 16 is very near the desired cylinder (TTG counter contents small) and moving slowly than when head 16 is still many cylinders away from the desired cylinder. Table II represents an acceptable compromise of these differing deceleration power requirements.

After the instructions represented by function boxes 86 or 87 have been executed, microprocessor 10 next executes the instructions corresponding to decision diamond 88. The contents of the TTG counter 24 are read up and tested to be greater than 1. If this condition is true, the instruction processing sequence begins again with the instructions represented by function block 82. If the current contents of TTG counter 24 are less than or equal to one, the seek has been completed and the instructions corresponding to function box 89 are executed. Voice coil timer 22 is cleared and the fine/coarse signal on path 28 is set for track following mode.

There are many other ways to mechanize this particular philosophy of carriage speed measurement and voice coil power control. In particular, the parameters in Tables I and II will have to be substantially changed each time a different system is controlled with this hardware. Also, it might be desirable to make the deceleration for a given time error between cylinder pulses dependent on the TTG value as well if read only memory becomes very inexpensive.

APPENDIX

TABLE I

IDEAL VELOCITY PROFILE IN TIME BETWEEN CYLINDER PULSES

| TRACKS TO GO | 0 | 1 | 2 | 3 | 4 | 5 | 6 | 7 | 8 | 9 | RESOLUTION |
|---|---|---|---|---|---|---|---|---|---|---|---|
| 000 | 255 | 219 | 173 | 146 | 124 | 104 | 92 | 81 | 75 | 67 | 4 US |
| 010 | 60 | 56 | 51 | 46 | 42 | 39 | 36 | 34 | 32 | 30 | 4 US |
| 020 | 29 | 27 | 25 | 25 | 25 | 24 | 23 | 22 | 21 | 21 | 4 US |
| 030 | 20* | 19* | 29* | 115 | 113 | 111 | 109 | 107 | 105 | 103 | 1 US |
| 040 | 102 | 100 | 99 | 98 | 96 | 95 | 94 | 93 | 92 | 91 | 1 US |
| 050 | 90 | 89 | 88 | 87 | 86 | 85 | 84 | 83 | 82 | 82 | 1 US |
| 060 | 81 | 80 | 79 | 79 | 78 | 77 | 77 | 76 | 75 | 75 | 1 US |
| 070 | 74 | 74 | 73 | 72 | 72 | 71 | 71 | 70 | 70 | 69 | 1 US |
| 080 | 69 | 68 | 68 | 68 | 67 | 67 | 66 | 66 | 65 | 65 | 1 US |
| 090 | 65 | 64 | 64 | 64 | 63 | 63 | 62 | 62 | 62 | 61 | 1 US |
| 100 | 61 | 61 | 60 | 60 | 60 | 60 | 59 | 59 | 59 | 58 | 1 US |
| 110 | 58 | 58 | 57 | 57 | 57 | 57 | 56 | 56 | 56 | 56 | 1 US |
| 120 | 55 | 55 | 55 | 55 | 54 | 54 | 54 | 54 | 54 | 53 | 1 US |
| 130 | 53 | 53 | 53 | 52 | 52 | 52 | 52 | 52 | 51 | 51 | 1 US |
| 140 | 51 | 51 | 51 | 51 | 50 | 50 | 50 | 50 | 50 | 49 | 1 US |
| 150 | 49 | 49 | 49 | 49 | 49 | 48 | 48 | 48 | 48 | 48 | 1 US |
| 160 | 48 | 47 | 47 | 47 | 47 | 47 | 47 | 47 | 46 | 46 | 1 US |
| 170 | 46 | 46 | 46 | 46 | 46 | 45 | 45 | 45 | 45 | 45 | 1 US |
| 180 | 45 | 45 | 45 | 44 | 44 | 44 | 44 | 44 | 44 | 44 | 1 US |
| 190 | 44 | 43 | 43 | 43 | 43 | 43 | 43 | 43 | 43 | 42 | 1 US |
| 200 | 42 | 42 | 42 | 42 | 42 | 42 | 42 | 42 | 42 | 41 | 1 US |
| 210 | 41 | 41 | 41 | 41 | 41 | 41 | 41 | 41 | 41 | 40 | 1 US |
| 220 | 40 | 40 | 40 | 40 | 40 | 40 | 40 | 40 | 40 | 39 | 1 US |
| 230 | 39 | 39 | 39 | 39 | 39 | 39 | 39 | 39 | 39 | 39 | 1 US |
| 240 | 39 | 38 | 38 | 38 | 38 | 38 | 38 | 38 | 38 | 38 | 1 US |
| 250 | 38 | 38 | 38 | 37 | 37 | 37 | | | | | 1 US |

(*)Scale in 4 usec.

TABLE II

VELOCITY ERROR (4 US. RESOLUTION) VERSUS VOICE COIL POWER DECELERATION PULSE DURATIONS IN USEC.

| ERROR | 0 | 1 | 2 | 3 | 4 | 5 | 6 | 7 | 8 | 9 | |
|---|---|---|---|---|---|---|---|---|---|---|---|
| 000 | — | 14 | 15 | 16 | 17 | 18 | 19 | 20 | 21 | 22 | USEC. |
| 010 | 23 | 24 | 25 | 26 | 27 | 28 | 36 | 37 | 38 | 39 | USEC. |
| 020 | 40 | 41 | 42 | 43 | 44 | 45 | 46 | 47 | 48 | 49 | USEC. |
| 030 | 50 | 51 | 52 | 53 | 54 | 55 | 56 | 57 | 58 | 59 | USEC. |
| 040 | 60 | 61 | 62 | 63 | 64 | 65 | 66 | 67 | 54 | 55 | USEC. |
| 050 | 56 | 57 | 58 | 59 | 60 | 61 | 62 | 63 | 64 | 65 | USEC. |
| 060 | 66 | 67 | 68 | 69 | 70 | 71 | 72 | 73 | 74 | 75 | USEC. |
| 070 | 76 | 77 | 78 | 79 | 80 | 81 | 82 | 83 | 84 | 85 | USEC. |
| 080 | 86 | 87 | 88 | 89 | 90 | 91 | 92 | 93 | 94 | 95 | USEC. |
| 090 | 96 | 97 | 98 | 99 | 100 | 101 | 102 | 103 | 104 | 105 | USEC. |
| 100 | 106 | 107 | 108 | 109 | 110 | 111 | 112 | 113 | 114 | 115 | USEC. |
| 110 | 116 | 117 | 118 | 119 | 120 | 121 | 122 | 123 | 124 | 125 | USEC. |
| 120 | 126 | 127 | 128 | 129 | 130 | 131 | 132 | 133 | 134 | 135 | USEC. |
| 130 | 136 | 137 | 138 | 139 | 140 | 141 | 142 | 143 | 144 | 255 | USEC. |
| 140 | 255 | 255 | 255 | 255 | 255 | 255 | 255 | 255 | 255 | 255 | USEC. |

TABLE II-continued

| VELOCITY ERROR (4 US. RESOLUTION) VERSUS VOICE COIL POWER DECELERATION PULSE DURATIONS IN USEC. | | | | | | | | | | |
|---|---|---|---|---|---|---|---|---|---|---|
| ERROR | 0 | 1 | 2 | 3 | 4 | 5 | 6 | 7 | 8 | 9 |
| . | . | . | . | . | . | . | . | . | . | . |
| . | . | . | . | . | . | . | . | . | . | . |
| 250 | 255 | 255 | 255 | 255 | 255 | | | | | USEC. |

What I claim is:

1. In a disk memory of the type having at least two rotatable disk surfaces, at least one carrying a plurality of concentric, circular, sequentially numbered servo tracks having a predetermined spacing; a carriage carrying transducer head arms and radially shifted with respect to the disk surfaces by a linear motor responsive to a motor control signal; a servo transducer head carried on a head arm in such proximity as to allow transducing of the servo information thereon when the servo disk surface is rotating; a servo signal demodulator receiving the output of the servo head and providing during radial movement of the servo head a track crossing signal comprised of cylinder pulses, each generated by the servo head's crossing of a predetermined area of each servo track; means receiving the servo transducer head output and supplying a motor control signal to the linear motor for causing the servo transducer head to maintain alignment with any servo track with which alignment currently exists; and computing means storing the number of the servo track aligned with the servo transducer head, and receiving a destination track number initiating a seek operation and responsive thereto computing and issuing an initial tracks-to-go value signal equal to the absolute difference between the number of the track with which the servo head is aligned and the destination track number and issuing a seek direction signal specifying the direction the servo transducer head must be moved to reach alignment with the destination track, wherein the invention comprises improved means for controlling servo transducer head velocity during each seek operation, comprising:

(a) timing means receiving the track crossing signal for providing a track crossing time signal encoding in real time the time elapsed between each adjacent pair of cylinder pulses;

(b) a tracks-to-go register receiving the initial tracks-to-go value signal from the computing means and storing said value, and receiving the cylinder pulses and decrementing by one the number of tracks to go responsive to each pulse, and supplying a current tracks-to-go signal encoding the contents of the tracks-to-go register; and (c) velocity control means receiving the track crossing time signal, the current and initial tracks-to-go signals and the seek direction signal for supplying a motor control signal causing the servo head to move radially to a position above the track specified by the initial tracks-to-go and seek direction signals, and approximately follow a predetermined velocity function dependent on the initial tracks-to-go value, said servo head velocity determined from the time encoded in the track crossing time signal and varied as a function of the current tracks-to-go signal value.

2. The improvement of claim 1, wherein the velocity control means further comprises acceleration control means for determining a minimum track crossing time during acceleration as a function of the initial tracks-to-go value, and for providing a motor control signal accelerating the servo transducer head toward the destination track when the minimum track crossing time is smaller than the last measured time in the track crossing time signal.

3. The improvement of claim 2, wherein the velocity control means further comprises deceleration velocity function means for supplying a preferred track crossing time signal responsive to receiving a tracks-to-go signal and related thereto, said times in said preferred track crossing time signal following those specified by the velocity function for the related tracks-to-go values; and wherein the acceleration control means further comprises maximum velocity selection means applying the initial tracks-to-go value to a preselected deceleration track algorithm and computing therefrom an intermediate tracks-to-go value, for supplying the intermediate tracks-to-go value as the signal to the deceleration velocity function means and receiving therefrom the related preferred track crossing time encoded in a signal, and supplying the time encoded in the preferred track crossing time signal from the deceleration velocity function means to the velocity control means as the minimum track crossing time.

4. The improvement of claim 1 wherein the velocity control means further comprises deceleration control means for determining according to the velocity function, a track crossing time for each of a series of current tracks-to-go values, and for providing a motor control signal decelerating the servo transducer head as it moves toward the destination track when the last measured time in the track crossing time signal is smaller than the track crossing time determined as a velocity function of the current tracks-to-go value.

5. The improvement of claim 4, wherein the deceleration means further comprises means for determining the difference between the track crossing time specified by the velocity function using the current tracks-to-go value as argument and the last measured time in the track crossing time signal, and means for supplying as a function of said time difference a motor control signal providing deceleration power on-time increasing with increasing time difference over at least one sequence of time differences.

6. The improvement of claim 1, wherein the velocity control means further comprises (a) a memory having a plurality of addressable locations, each address associated according to a predetermined indexing algorithm with at least one of a predetermined sequence of tracks-to-go values, the contents of each such location containing a value encoding a track crossing time specified by the predetermined velocity function with the associated tracks-to-go value as argument, said memory supplying the contents of each such location responsive to receiving the locations's address;

(b) motor controller means receiving the current tracks-to-go signal and the crossing time signal, for supplying the memory with the address associated according to the indexing algorithm with the current tracks-to-go value and receiving the contents of the location addressed thereby, and for comparing the track crossing time value encoded therein with the latest track crossing time in the crossing time signal, and if the time value in the crossing time signal is different from the time value received from the memory, supplying a motor control signal changing the speed of the servo head to more nearly match the next measured track crossing time to the time received from the memory.

7. The improvement of claim 6, wherein the motor controller means further comprises:
(a) means for applying the initial tracks-to-go value to a preselected deceleration track algorithm and generating therefrom a deceleration tracks-to-go value, said value being smaller than the initial tracks-to-go value;
(b) acceleration control means receiving the deceleration tracks-to-go value, supplying the memory with the address associated therewith, and receiving from the memory the track crossing time supplied responsive thereto, for providing a motor control signal accelerating the servo transducer head toward the destination track when (i) the track crossing time received from the memory responsive to the deceleration tracks-to-go value is smaller than the latest track crossing time encoded in the track crossing time signal, and (ii) the current tracks-to-go value is greater than the deceleration tracks-to-go value.

8. The improvement of claim 7, wherein the motor controller means further comprises bang-bang deceleration control means receiving the deceleration tracks-to-go value and the current tracks-to-go value, for supplying a motor control signal decelerating the servo transducer head as it moves toward the destination track when (i) the current tracks-to-go value is less than the deceleration tracks-to-go value, and (ii) the track crossing time value encoded in the signal from the memory is larger than the latest track crossing time encoded in the tracks crossing time signal.

9. The improvement of claim 7 wherein the memory further comprises a plurality of addressable locations, each address associated according to a predetermined error algorithm with one of a plurality of predetermined error times, the contents of each such address specified by a predetermined proportional deceleration function specifying the decelerating force for each associated error time, and wherein the motor controller means comprises means for generating an error time by forming the difference between the track crossing time value encoded in the signal from the memory and the latest track crossing time in the track crossing signal, for supplying an address computed according to the error algorithm using the latest error time generated, and for receiving the contents of the memory location addressed thereby and supplying a motor control signal to the motor causing the motor to supply the associated decelerating force to the carriage.

10. The improvement of claim 9, wherein the memory stores a motor "on" time for each decelerating force stored, and wherein the motor controller means further comprises means for supplying the associated on time in each motor control signal.

* * * * *